(No Model.)
A. REIMANN.
LUBRICATING DEVICE.
No. 576,613. Patented Feb. 9, 1897.
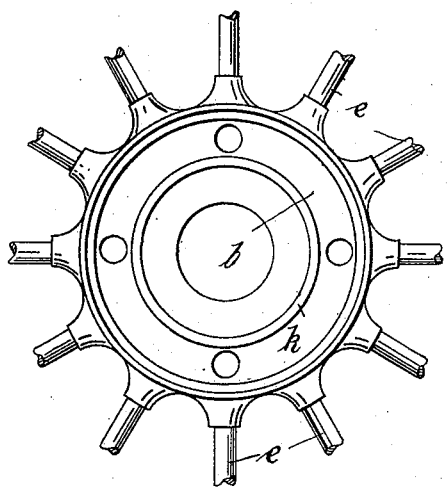
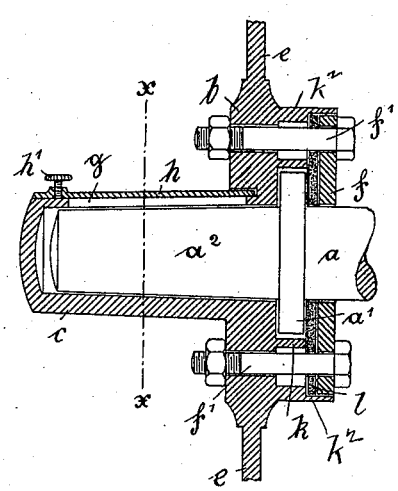

UNITED STATES PATENT OFFICE.

AUGUST REIMANN, OF FRIEDRICHSBERG, GERMANY.

LUBRICATING DEVICE.

SPECIFICATION forming part of Letters Patent No. 576,613, dated February 9, 1897.

Application filed January 9, 1896. Serial No. 574,897. (No model.)

*To all whom it may concern:*

Be it known that I, AUGUST REIMANN, a subject of the King of Prussia, German Emperor, residing at Friedrichsberg, in the Kingdom of Prussia, German Empire, have invented certain new and useful Improvements in Lubricating Devices, of which the following is a specification.

The present invention relates to the construction of wheel-hubs by which the lubrication will be easily effected, while using less lubricating material, and the penetration of dust will be prevented.

The accompanying drawings illustrate the subject-matter of the invention.

Figure 1 shows a hub seen from the rear; Fig. 2, a longitudinal section of the same.

A shoulder $a'$ is provided upon the axle $a$, which serves for fixing the hub $b$. The journal $a^2$ of the axle is conical or cylindrical and is surrounded by the wheel-box $c$. The box $c$ may be made in one piece with the hub $b$ or be secured thereto. The spokes $e$, that carry the rim, are shown broken off.

At the inside is a disk $f$, which, by means of screw-bolts $f'$, is connected with the hub $b$ in such a manner that the shoulder $a'$ finds its place between the hub $b$ and the disk $f$. It is thus that the wheel is fixed to the axle.

In order to introduce the lubricating material more easily and to better distribute the same, a slit $g$ is made in the wheel-box, covered by a tightly-closing slide $h$. Slide $h$ is kept in position by a binding-screw $h'$. It will be easy to introduce the lubricating material through the slit and to distribute the same, so that even when the boxes are very long the lubricating will be rapid. In order that the lubricating material be not dispersed inside, a protecting-ring $k$ is provided inside of the hub and close around the shoulder $a'$, which is shut off by a disk $l$, of rubber or the like, so that a circular closed reservoir is formed. The lubricating material that would tend to come out inside from the box is held back, and the shoulder $a'$ is kept well lubricated. This packing-disk prevents, moreover, effectively the penetrating of dirt inside the box.

Concentric with the ring or flange $k$ is a second ring or flange $k^2$ on the inner face of the hub, with an annular space between it and the ring $k$, through which space the holding-bolts $f'$ pass. The ring $k^2$ is more extensive than the ring $k$ and has a shoulder for receiving the rubber ring and the back plate.

I claim—

In combination, the axle having the shoulder $a'$ and the hub having an oil-box, and provided on its inner face with concentric flanges with an annular space between them, the said inner flange being close to the periphery of the shoulder $a'$ and the outer flange being more extended and having a shoulder, the rubber disk fitting against the edge of the inner flange and against the shoulder of the outer flange, the plate $f$ fitting against the rubber disk, and the holding-bolts extending through the disk and the plate and through the annular space between the flanges, substantially as described.

In witness whereof I have hereunto set my hand in presence of two witnesses.

AUGUST REIMANN.

Witnesses:
 MAURICE J. HAHLO,
 W. HAUPT.